United States Patent
Usuda et al.

(10) Patent No.: US 8,588,802 B2
(45) Date of Patent: Nov. 19, 2013

(54) TRANSMISSION RATE CONTROL METHOD, AND MOBILE STATION

(75) Inventors: Masafumi Usuda, Yokosuka (JP); Anil Umesh, Yokohama (JP)

(73) Assignee: NTT DoCoMo, Inc., Toyko (JP)

(*) Notice: Subject to any disclaimer, the term of this patent is extended or adjusted under 35 U.S.C. 154(b) by 701 days.

(21) Appl. No.: 11/352,199

(22) Filed: Feb. 13, 2006

(65) Prior Publication Data

US 2006/0189320 A1 Aug. 24, 2006

(30) Foreign Application Priority Data

Feb. 14, 2005 (JP) ................. P2005-036919

(51) Int. Cl.
*H04W 72/00* (2009.01)
(52) U.S. Cl.
USPC ........ 455/452.2; 370/229; 370/230; 370/232; 370/233; 370/234; 370/235; 455/403; 455/422.1; 455/450; 455/452.1
(58) Field of Classification Search
USPC .......... 370/229–230, 232–235; 455/403, 455/422.1, 450, 452.1–452.2
See application file for complete search history.

(56) References Cited

U.S. PATENT DOCUMENTS

| 7,369,621 | B2 * | 5/2008 | Yoshii et al. ................. 375/261 |
| 2002/0136181 | A1 * | 9/2002 | Belaiche et al. ............. 370/337 |
| 2002/0147020 | A1 | 10/2002 | Iguchi et al. |
| 2005/0030964 | A1 | 2/2005 | Tiedemann, Jr. et al. |
| 2005/0036449 | A1 * | 2/2005 | Ranta-Aho et al. ........... 370/235 |
| 2008/0212524 | A1 * | 9/2008 | Niwano ....................... 370/329 |

FOREIGN PATENT DOCUMENTS

| EP | 1455492 A2 | 8/2004 |
| JP | 2003-052069 A1 | 2/2003 |
| JP | 2006-518173 A1 | 8/2006 |
| WO | WO 2004/064441 A1 | 7/2004 |

OTHER PUBLICATIONS

3GPP TS25.211 v6.3.0 (Dec. 2004); 3rd Generation Partnership Project; Technical Specification Group Radio Access Network; Physical channels and mapping of transport channels . . . .
3GPP TSG-RAN WG2 #45bis Meeting, Tdoc R2-050229; Agenda item: 11.2; Source: Ericsson, Nokia, etc . . . ; Title: Proposed way forward on relationship between HARQ and scheduling.
Official Action issued on Feb. 26, 2008 in the counterpart Japanese Application.
Search Report issued on May 22, 2006 in the counterpart European application/ Application No. 06002923.8-2416/ Applicant: NTT DoCoMo, Inc.

(Continued)

*Primary Examiner* — Patrick Edouard
*Assistant Examiner* — Matthew Genack
(74) *Attorney, Agent, or Firm* — Marvin A. Motsenbocker; Mots Law, PLLC

(57) ABSTRACT

A transmission rate control method for controlling a transmission rate of user data transmitted by a mobile station via a logical channel, include: notifying, at a radio network controller, a guaranteed bit rate of the logical channel to the mobile station; and controlling, at the mobile station, a transmission rate of uplink user data to be transmitted via the logical channel without following a command in a relative rate grant channel received from a cell to which the mobile station connects.

2 Claims, 7 Drawing Sheets

(56) References Cited

OTHER PUBLICATIONS

Universal Mobile Telecommunications System (UMTS); FDD enhanced uplink; Overall description; Stage 2 (3GPP TS 25.309 version 6.1.0 Release 6); ETSI TS 125 309; -continued-.

ETSI Standards, European Telecommunications Standards Institute, Sophia-Antipo, FR, vol. 3-R2, No. V610, Dec. 2004, XP014027652.
Official Action issued on May 9, 2008 in the counterpart Chinese Patent Application.

* cited by examiner

TRANSMISSION RATE CONTROL METHOD, AND MOBILE STATION

CROSS REFERENCE TO RELATED APPLICATION

This application is based upon and claims the benefit of priority from the prior Japanese Patent Application No. P2005-036919, filed on Feb. 14, 2005; the entire contents of which are incorporated herein by reference.

BACKGROUND OF THE INVENTION

1. Field of the Invention

The present invention relates to a transmission rate control method for controlling a transmission rate of uplink user data to be transmitted by a mobile station via a logical channel, and a mobile station.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed high-speed.

However, as shown in FIG. 1, the radio network controller RNC integrally controls a plurality of radio base stations Node B in general. Therefore, in the conventional mobile communication system, there has been a problem that it is difficult to perform high-speed control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the high-speed control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(b) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data of the mobile station UE per a predetermined timing, so as to signal information relating to a mobile station ID as well as the transmission rate of user data (or a maximum allowable transmission rate of user data).

The mobile station UE that is designated by the radio base station Node B transmits user data at the designated timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data.

However, the maximum allowable transmission rate of the user data, which is determined by the radio base station Node B and signaled to each mobile station UE for each transmission frame or each of a plurality of transmission frames, is used.

Here, when the maximum allowable transmission rate is signaled, the radio base station Node B signals the maximum allowable transmission rate itself, or a relative value thereof (for example, three values of "Up command", "Down command", and "Hold command"), at this timing.

Third, a radio resource control method that is referred to as "Rate Control per Cell" has been discussed.

In such a radio resource control method, a radio base station Node B signals a transmission rate of user data, which is common among mobile stations UE in communication, or information needed to calculate the transmission rate, and each mobile station UE determines a transmission rate of user data based on the received information.

Although a downlink control signal load and a transmission rate control load in the radio base station Node B or the like exist, as proposed in "Time & Rate Control" and "Rate Control per UE", to control the transmission rate of the each mobile station UE, respectively, can be a good control methods for improving radio capacity in an uplink.

As shown in FIG. 3, "Rate Control per UE" is configured to control the transmission rate of user data using an "Absolute rate Grant Channel (AGCH)" and a "Relative rate Grant Channel (RGCH)".

By using the RGCH frequently, it is possible to simplify the control signals transmitted from the radio base station Node B for controlling the transmission rate of user data, and to reduce effects in a downlink, which is caused by the control signals.

The detailed performance of the transmission rate control using the RGCH, which includes three values of an "Up command", a "Down Command" and a "Hold Command", is described in Non-Patent literature 1 (3GPP TSG RAN R2-050229).

As described in the Non-Patent literature 1, the method that instructs to increase, decrease or hold the last transmission rate of HARQ is common.

Further, in each cell, the interference volume of a mobile station UE designating another cell as a serving cell (a non-serving mobile station) have to be considered.

When the interference volume from non-serving mobile station UE is increased, in each cell, the RGCH including the "Down Commend" for decreasing the transmission rate of user data transmitted from the non-serving mobile station UE is transmitted.

Here, the RGCH for non-serving mobile station UE includes binary of a "Down Command" and a "Do Not Care Command", and is different from the RGCH transmitted from a serving cell set.

Furthermore, as described in Non-Patent literature 2 (3GPP TSG RAN TS25.309 V.6.1.0), if at least one "Down Command" is received during a communication with the serving cell and more than one non-serving cells, the mobile station UE is configured to prioritize the received "Down Command", so as to control the transmission rate of user data.

Accordingly, as described above, in the EUL, it is possible to change a transmission rate of uplink user data in each mobile station UE at high-speed, and dynamically, using an interference level in a radio link and processing resources of the radio base station Node B and the like.

However, in each logical channel, Quality of Service (QoS) has been set.

For Example, a logical channel used for a voice communication can be low-speed of a few kbps to few dozen of kbps. However, the voice communication needs to be received by a receiver without a delay.

In addition, a logical channel used for an image communication and the like needs a transmission rate having predetermined level. Here, the transmission rate having predetermined level can be expressed as a "Guaranteed Bit Rate (GBR)".

However, there has been a problem that a transmission rate of user data may be below the GBR of a logical channel, when a mobile station UE, which transmits user data via the logical channel having the GBR, controls the transmission rate of user data by following a received "Down Command".

BRIEF SUMMARY OF THE INVENTION

The present invention has been made considering the problems, and its object is to provide a transmission rate control method and a mobile station which enable to guarantee the QoS in each logical channel by not following the "Down Command" in the RGCH, when a transmission rate of uplink user data is below the GBR.

A first aspect of the present invention is summarized as a transmission rate control method for controlling a transmission rate of user data transmitted by a mobile station via a logical channel, including: notifying, at a radio network controller, a guaranteed bit rate of the logical channel to the mobile station; and controlling, at the mobile station, a transmission rate of uplink user data to be transmitted via the logical channel without following a command in a relative rate grant channel received from a cell to which the mobile station connects.

In the first aspect, in the controlling step, the mobile station can control the transmission rate of the uplink user data without following the command in the relative rate grant channel, when the transmission rate of the uplink user data is below the guaranteed bit rate.

In the first aspect, the transmission rate control method can further include: comparing, at the mobile station, the transmission rate of the uplink data with the guaranteed bit rate, when the mobile station receives the relative rate grant channel.

A second aspect of the present invention is summarized as a mobile station for transmitting uplink user data via a logical channel, including: a QoS information receiving unit configured to receive a guaranteed bit rate of the logical channel from a radio network controller; and a transmission rate control unit configured to control a transmission rate of uplink user data to be transmitted via the logical channel without following a command in a relative rate grant channel received from a cell to which the mobile station connects.

In the second aspect, the transmission rate control unit can be configured to control the transmission rate of the uplink user data without following the command in the relative rate grant channel, when the transmission rate of the uplink user data is below the guaranteed bit rate.

In the second aspect, the mobile station can further include a comparing unit configured to compare the transmission rate of the uplink user data with the guaranteed bit rate, when the mobile station receives the relative rate grant channel.

DETAILED DESCRIPTION OF THE INVENTION (Configuration of Mobile Communication System According to First Embodiment of the Present Invention)

Referring to FIGS. 4 to 11, a configuration of a mobile communication system according to a first embodiment of the present invention will be described.

Figure 1:
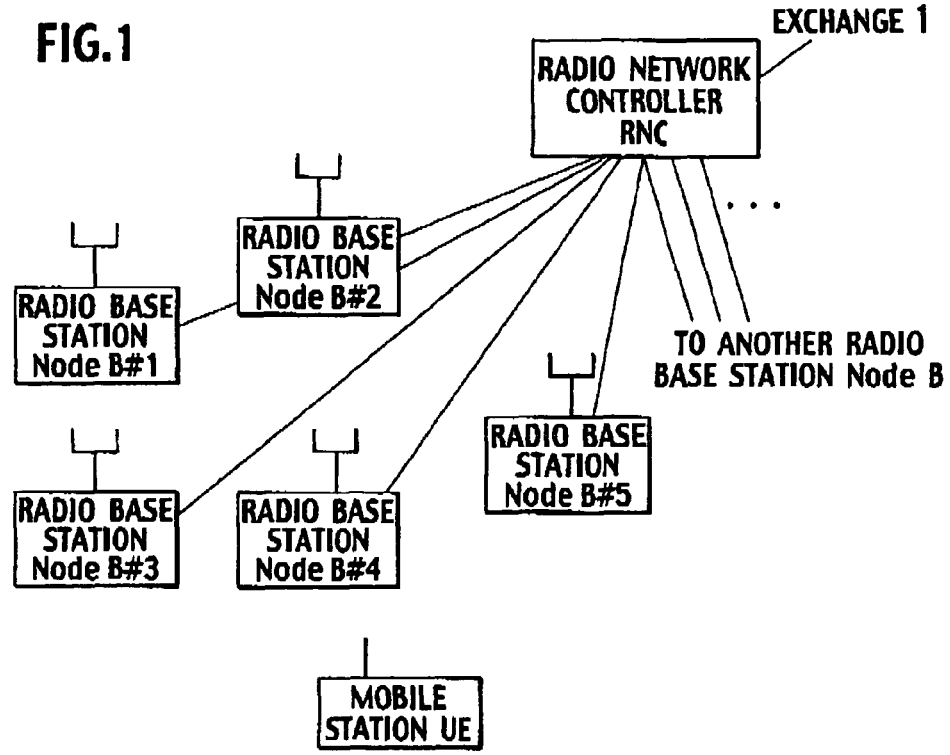
FIG. 1 is a diagram of an entire configuration of a general mobile communication system.
Figure 2:
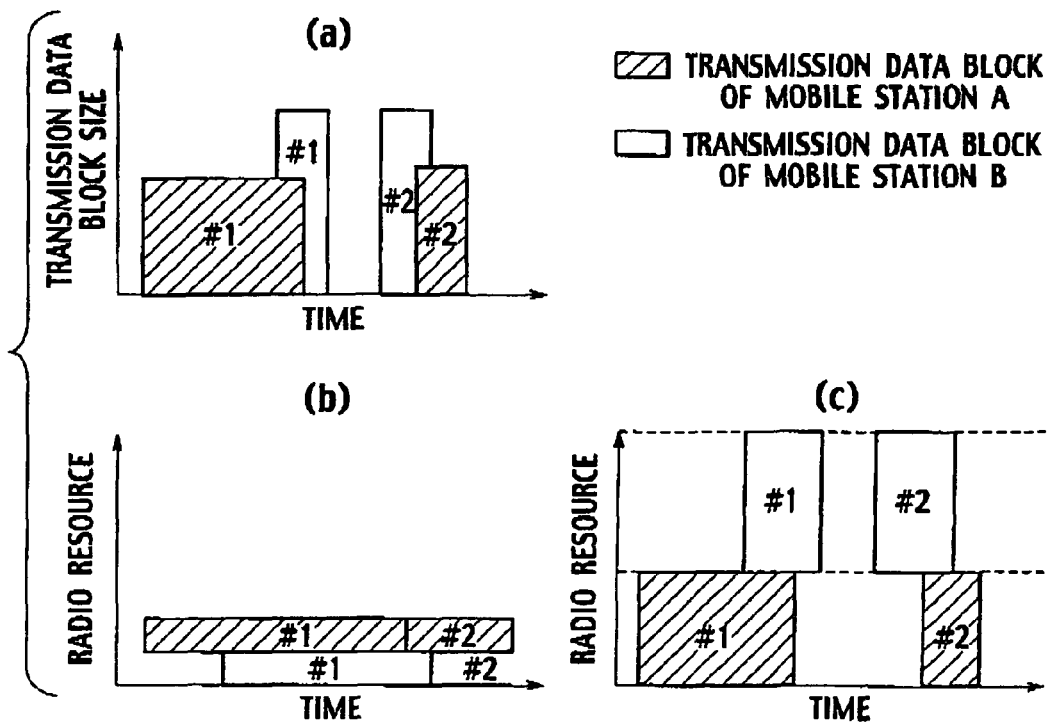
FIGS. 2(a) to 2(c) are diagrams illustrating operations at the time of burst data transmission in a conventional mobile communication system.
Figure 3:
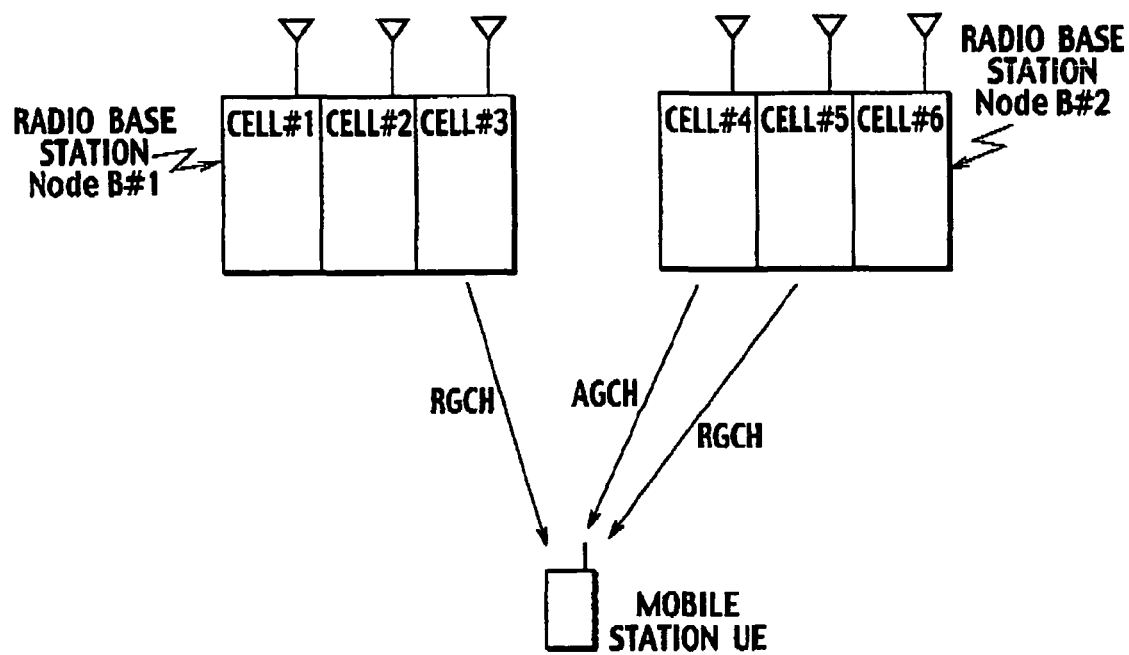
FIG. 3 is a diagram illustrating an example of channels transmitted from a radio base station in the conventional mobile communication system.

It should be noted that, as shown in FIG. 1, the mobile communication system according to this embodiment is provided with a plurality of radio base stations Node B #1 to Node B #5 and a radio network controller RNC.

The mobile communication system according to this embodiment is configured to automatically increase a transmission rate of user data that is transmitted by a mobile station UE via an uplink up to the maximum allowable transmission rate.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied, and a "Random Access Channel (RACH)", are also used.

The HS-DPCCH transmits a Channel Quality Indicator (CQI) in a downlink and an acknowledge signal (Ack or Nack) for the HS-DPCCH.

Figure 4:
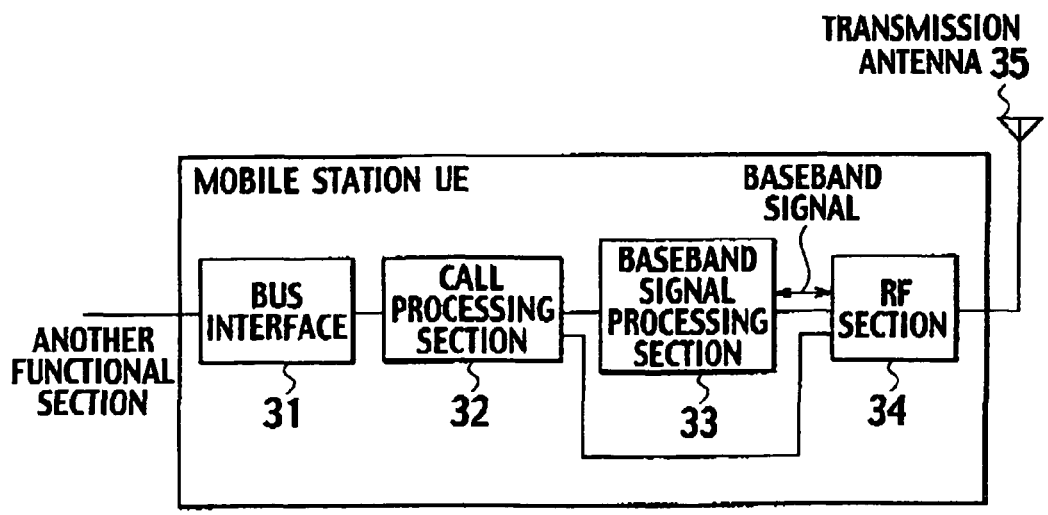
FIG. 4 is a functional block diagram of a mobile station in the mobile communication system according to an embodiment of the present invention.

As shown in FIG. 4, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 5:
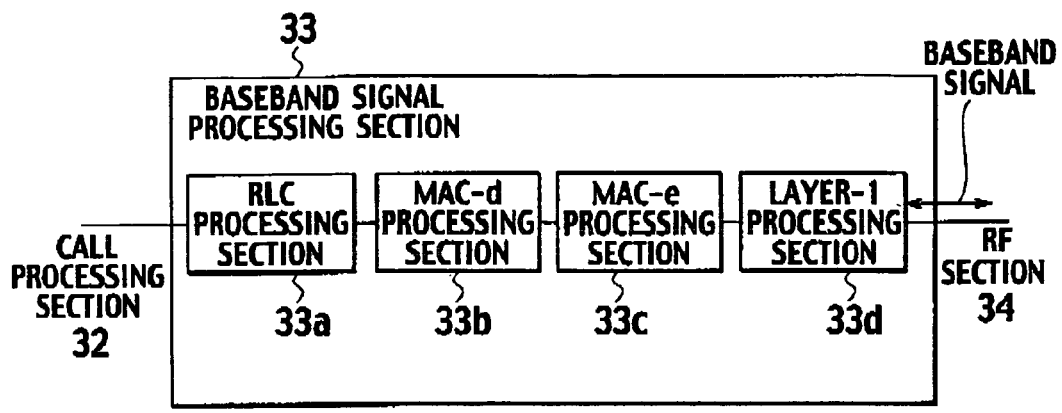
FIG. 5 is a functional block diagram of a baseband signal processing section of the mobile station in the mobile communication system according to the embodiment of the present invention.

As shown in FIG. 5, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power in the uplink.

Figure 6:
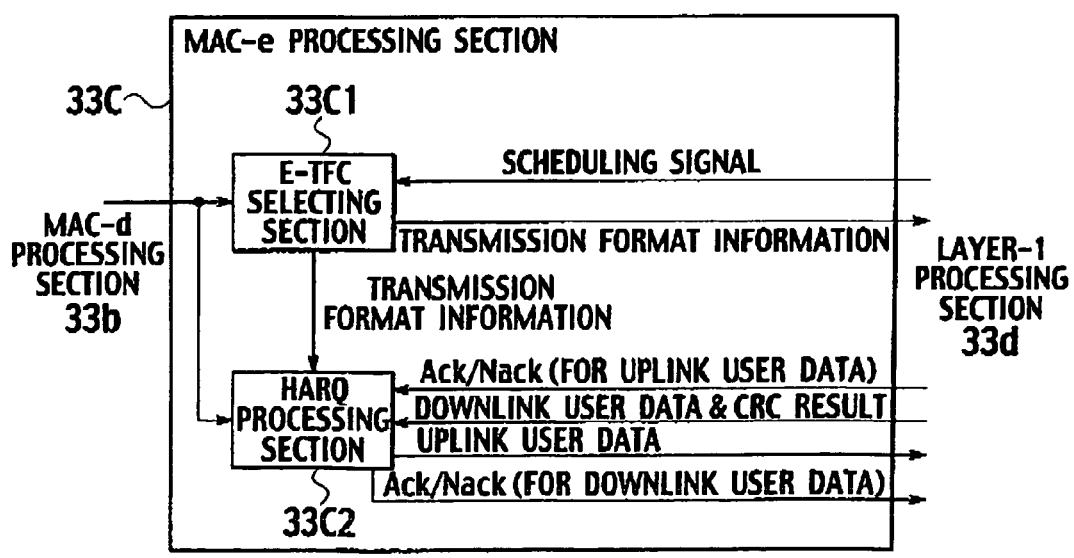
FIG. 6 is a functional block diagram of a MAC-e processing section of the baseband signal processing section in the mobile station of the mobile communication system according to the embodiment of the present invention.

As shown in FIG. 6, the MAC-e processing section 33c is provided with an Enhanced Transport Format Combination (E-TFC) selecting section 33c1 and an HARQ controlling section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, an transmission power ratio between the E-DPDCH and the OPCCH, or the like) to the layer-1 processing section 33d, and also to transmit the determined transmission format information to the HARQ controlling section 33c2.

Here, the scheduling signals include the absolute value of the maximum allowable transmission rate of user data in the mobile station UE (for example, the block size of maximum allowable transmission data, a maximum value of the transmission power ratio between the E-DPDCH and the DPCCH (maximum allowable transmission power ratio) or the like) which is transmitted through the AGCH, a parameter relating to the maximum allowable transmission rate, the relative value transmitted through RGCH, that relative value indicates to change the maximum allowable transmission rate transmitted through the AGCH, or the like.

Unless particularly described in this specification, the maximum allowable transmission rate includes the parameter relating to the maximum allowable transmission rate.

Such a scheduling signal is information that is signaled in the cell where the mobile station UE is located, and includes control information for all the mobile stations located in the cell, or a specific group of the mobile stations located in the cell.

In addition, when receiving a new AGCH, the E-TFC selecting section 33c1 prioritizes an absolute value of the maximum allowable transmission rate included in the new AGCH, and determines transmission format information.

Further, the E-TFC selecting section 33c1 is configured to receive a guaranteed bit rate (GBR) of each logical channel from the radio network controller RNC.

Here, the E-TFC selecting section 33c1 is configured to determine whether or not to control the transmission rate of uplink user data by following the indication of the RGCH which is transmitted from the serving cell or the non-serving cells that the mobile station UE is connecting to, based on the GBR of each logical channel notified from the radio network controller RNC.

Specifically, the E-TFC selecting section 33c1 is configured to compare the transmission rate of uplink user data transmitted via the logical channel with the GBR of the logical channel, when receiving the RGCH which is transmitted from the serving cell or the non-serving cell that the mobile station UE is connecting to.

Then, the E-TFC selecting section 33c1 is configured to control the transmission rate of uplink user data without following the indication ("Down Command") of the RGCH, when the transmission rate of uplink user data is below the GBR.

The HARQ controlling section 33c2 is configured to perform process control for the "N process stop and wait", so as to transmit the user data in the uplink based on an acknowledge signal (Ack/Nack for uplink data) transmitted from the radio base station Node B.

Specifically, the HARQ controlling section 33c2 is configured to determine whether or not the receive processing of downlink user data has been successful based on the result of the "Cyclic Redundancy Check (CRC)" entered from the layer-1 processing section 33d.

Then, the HARQ controlling section 33c2 is configured to generate an acknowledge signal (Ack/Nack for downlink user data) based on the determined result, so as to transmit the acknowledge signal to the layer-1 processing section 33d.

In addition, the HARQ controlling section 33c2 is configured to transmit, to the MAC-d processing section 33b, the downlink user data entered from the layer-1 processing section 33d when the above-described determined result has been successful.

Figure 7:
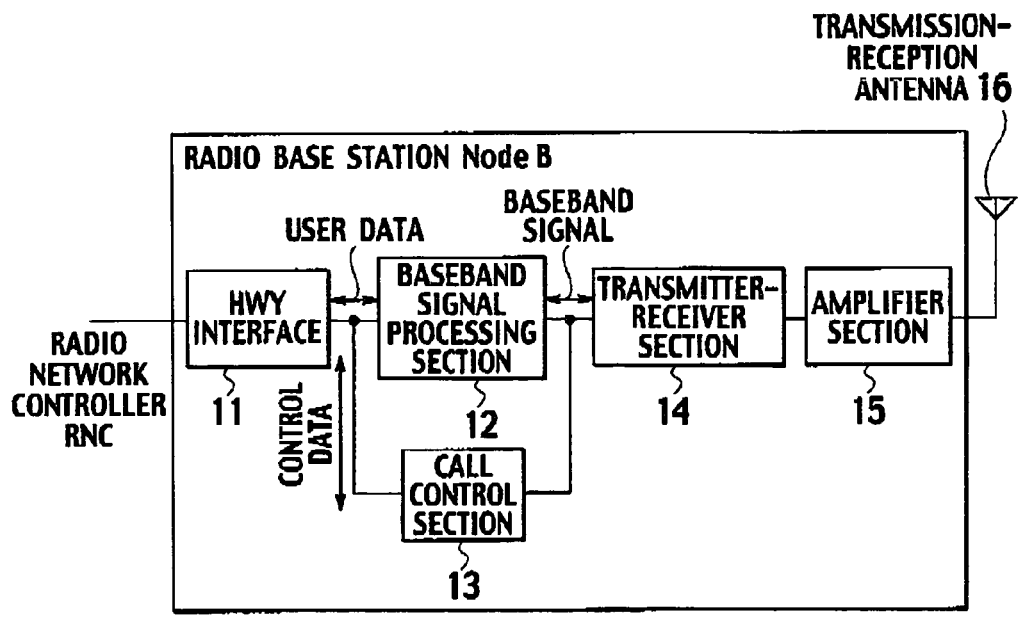
FIG. 7 is a functional block diagram of a radio base station of the mobile communication system according to the embodiment of the present invention.

As shown in FIG. 7, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 8:
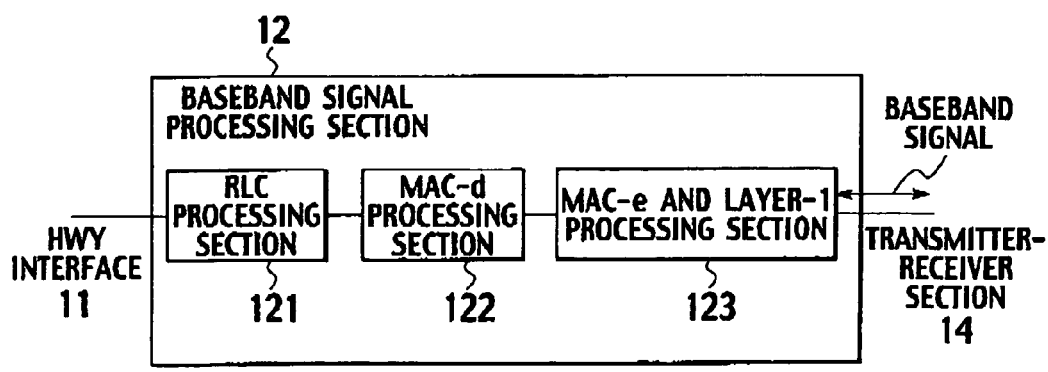
FIG. 8 is a functional block diagram of a baseband processing section in the radio base station of the mobile communication system according to the embodiment of the present invention.

As shown in FIG. 8, the baseband signal processing section 12 is provided with a RLC processing section 121, a MAC-d processing section 122, and a MAC-e and layer-1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a header disposal processing against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

Figure 9:
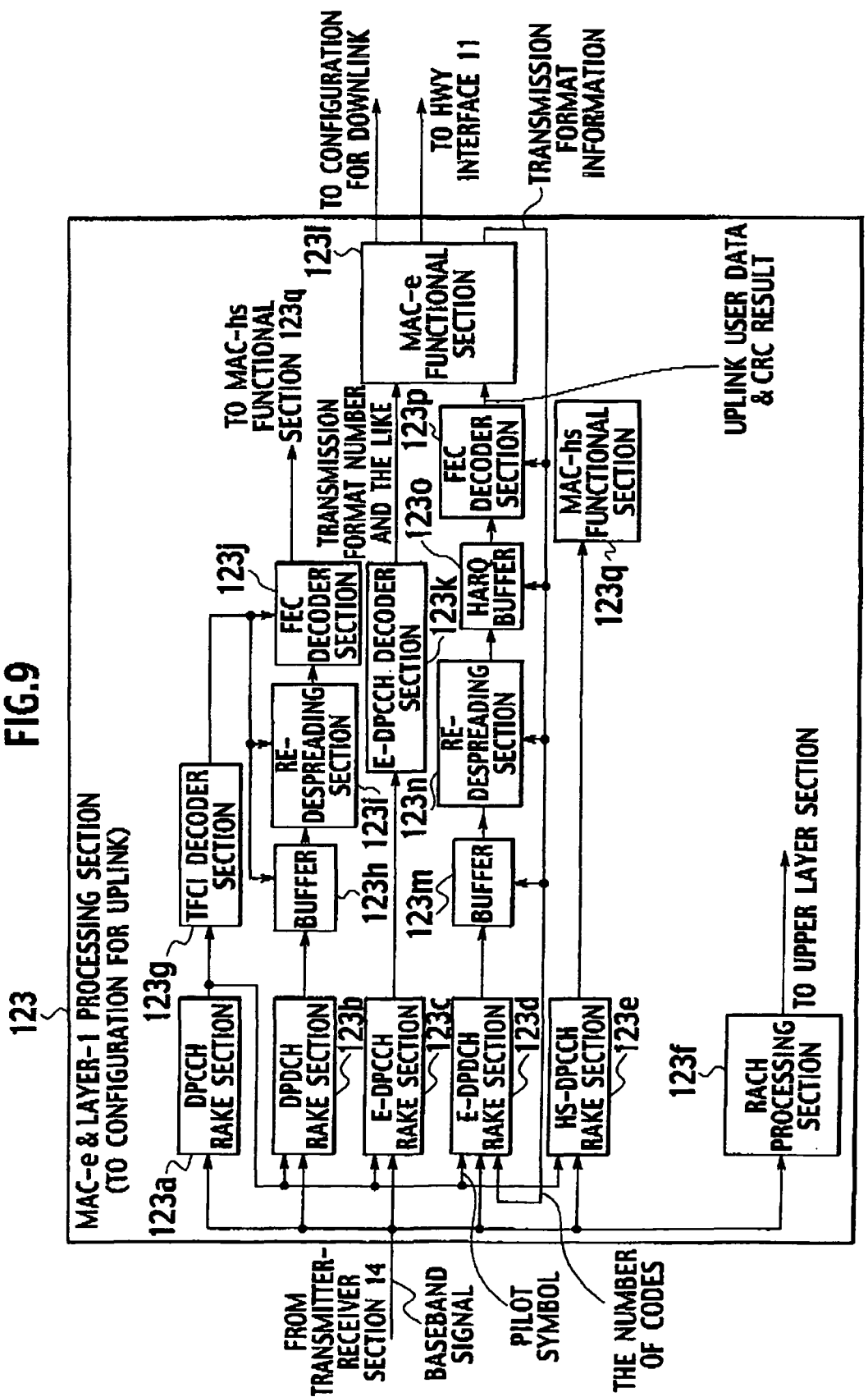
FIG. 9 is a functional block diagram of a MAC-e and layer-1 processing section (configured for an uplink) in the baseband signal processing section in the radio base station of the communication system according to the embodiment of the present invention.

As shown in FIG. 9, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r (not shown).

The E-DPCCH RAKE section 123c is configured to perform, against the E-DPCCH in the baseband signals transmitted from the transmitter-receiver section 14, the despreading processing, and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d which is stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decode processing (the FEC decode processing) against the despreading processing outputs of the re-despreading section 123n, which is stored in the HARQ buffer 123o, based on the transmission format information (transmission data block size) transmitted from the MAC-e functional section 123l.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 10:
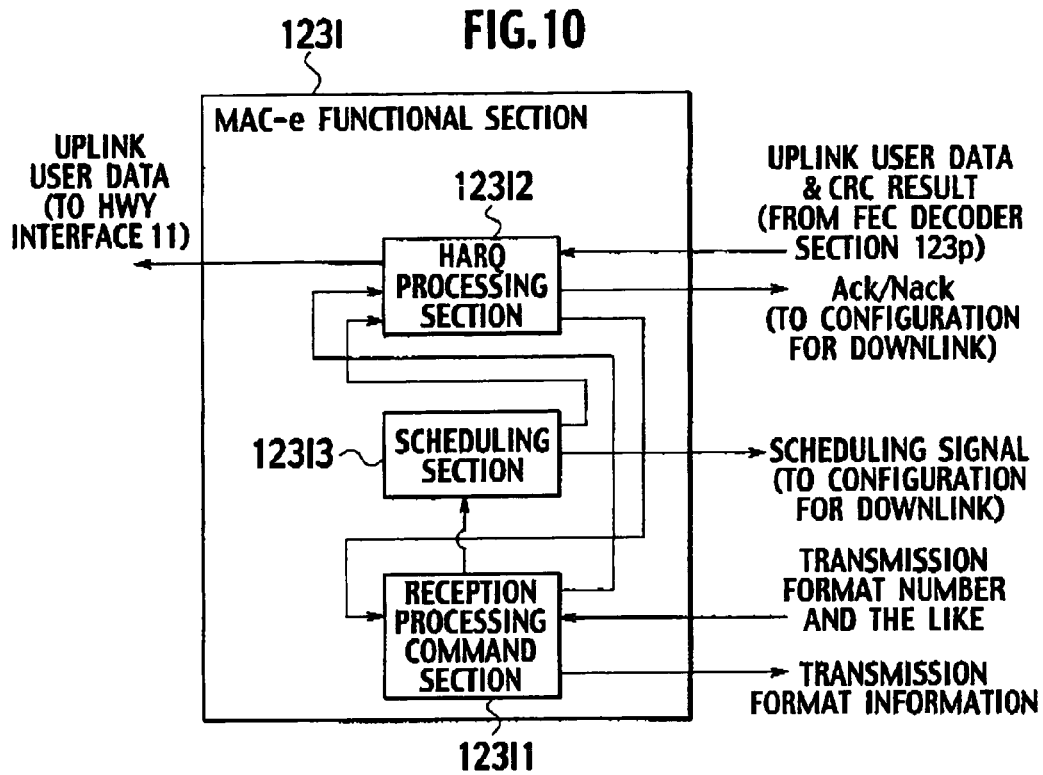
FIG. 10 is a functional block diagram of the MAC-e functional section of the MAC-e and layer-1 processing section (configured for the uplink) in the baseband signal processing section in the radio base station of the mobile communication system according to the embodiment of the present invention.

In addition, as shown in FIG. 10, the MAC-e functional section 123l is provided with a receive processing command section 123/1, an HARQ controlling section 123/2, and a scheduling section 123/3.

The receive processing command section 123/1 is configured to transmit the transmission format number related information, the HARQ related information, and the scheduling related information, which are entered from the E-DPCCH decoder section 123k, to the HARQ controlling section 123/2.

In addition, the receive processing command section 123/1 is configured to transmit, to the scheduling section 123/3, the scheduling related information entered from the E-DPCCH decoder section 123k.

Further, the receive processing command section 123/1 is configured to output the transmission format information corresponding to the transmission format number entered from the E-DPCCH decoder section 123k.

The HARQ controlling section 123/2 is configured to determine whether or not the receive processing of uplink user data has been successful, based on the result of the CRC entered from the FEC decoder section 123p.

Then, the HARQ controlling section 123/2 is configured to generate an acknowledge signal (Ack or Nack), based on the determined result, so as to transmit the generated acknowledge signal to the configuration for the downlink of the baseband signal processing section 12.

In addition, the HARQ controlling section 123/2 is configured to transmit the uplink user data entered from the FEC decoder section 123p to the radio network controller RNC, when the above-described determined result has been successful.

In addition, the HARQ controlling section 123/2 is configured to clear soft decision values stored in the HARQ buffer 123o, when the above-described determined result has been successful.

On the other hand, the HARQ controlling section 123/2 is configured to store, in the HARQ buffer 123o, the uplink user data, when the above-described determined result has not been successful.

In addition, the HARQ controlling section 123/2 is configured to forward the above-described determined result to the receive processing command section 123/1.

The receive processing control command section 123/1 is configured to notify the E-DPDCH RAKE section 123d and the buffer 123m of an hardware resource that should be prepared for the following transmission time interval (TTI), based on the received determined result, so as to perform notification for reserving the resource in the HARQ buffer 123o.

In addition, when the uplink user data is stored in the buffer 123m, the receive processing command section 123/1 is configured to designate the HARQ buffer 123o and the FEC decoder section 123p to perform the FEC decode processing after adding the uplink user data, which is stored in the HARQ buffer 123o, in a process corresponding to the TTI and a newly received uplink user data, per TTI.

In addition, the scheduling section 123/3 is configured to designate the configuration for the downlink of the baseband signal processing section 12 so as to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123/3 is configured to determine the maximum allowable transmission rate based on the scheduling related information transmitted from E-DPCCH decoder section 123k, so as to control the transmission rate of user data in a mobile station in communication.

The radio network controller RNC according to this embodiment is an apparatus located in an upper level of the radio base station Node B, and is configured to control radio communications between the radio base station Node B and the mobile station UE.

Figure 11:
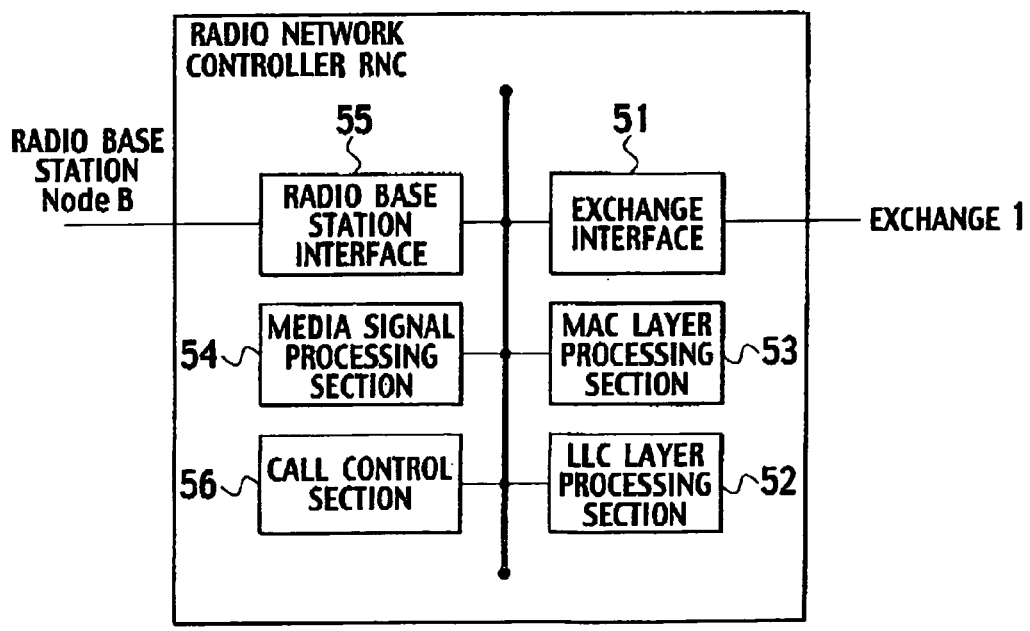
FIG. 11 is a functional block diagram of a radio network controller of the mobile communication system according to the embodiment of the present invention.

As shown in FIG. 11, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC (Logical Link Control) sub-layer processing such as a combining processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like.

Here, the radio resource control processing includes a call admission control processing, a handover processing, or the like.

The call control section 56 is configured to set and notify a GBR of each logical channel to the mobile station UE.

(Operations of Mobile Communication System According to First Embodiment of the Present Invention)

Figure 12:
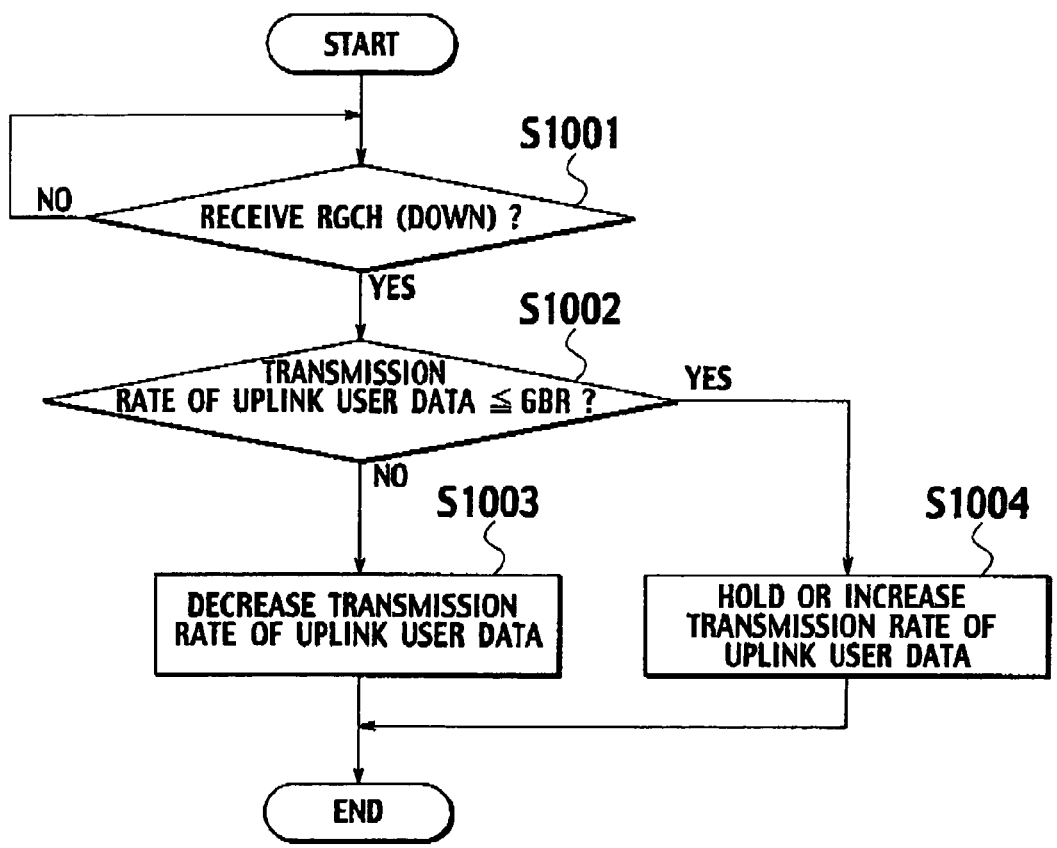
FIG. 12 is a flow chart showing operations of the mobile communication system according to the embodiment of the present invention.

Referring to FIG. 12, operations of the mobile communication system according to the first embodiment of the present invention are described below.

As shown in FIG. 12, in step S1001, a mobile station UE determines whether or not an RGCH, which is transmitted from a serving cell or a non-serving cell that the mobile station UE is connecting to, is received.

When an RGCH is received, in step S1002, the mobile station UE compares a transmission rate of uplink user data which is transmitted through a logical channel with a GBR of the logical channel which is notified from a radio network controller RNC, so as to determine whether or not the transmission rate of uplink user is below the GBR.

When the transmission rate of the uplink data is not below the GBR, in step S1003, the mobile station UE decreases the transmission rate of the uplink user data by following the "Down Command" in the received RGCH.

On the other hand, when the transmission rate of the uplink user data is below the GBR, in step S1004, the mobile station UE holds or increases the transmission rate of the uplink user data without following the "Down Command" in the received RGCH.

According to another example, after step S1001, the mobile station UE directly proceeds to step S1004.

In step S1004, the mobile station UE disregards the received RGCH, to control the transmission rate of the uplink user data without following the "Down Command" in the received RGCH (for example, with following the GBR).

Also, the mobile station UE can proceed to step S1004 without performing the comparing process in step S1002.

In this case, the mobile station UE performs step S1004, when the transmission rate of the uplink user data is below the GBR, for example, based on an external instruction.

(Actions and Effects of Mobile Communication System According to First Embodiment of the Present Invention)

According to the mobile communication system in accordance with the first embodiment of the present invention, it becomes possible to guarantee the QoS in each logical channel by not following the "Down Command" in the received RGCH, when a transmission rate of uplink user data is below the GBR.

Further, according to the present invention, it becomes possible to provide the transmission rate control method and the mobile station, which can guarantee a QoS in each logical channel by not following the "Down Command" in the received RGCH, when the transmission rate of uplink user data is below the GBR.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling a transmission rate of user data transmitted by a mobile station via a logical channel, comprising:
   receiving a rate command for the logical channel via a relative rate grant channel from a cell to which the mobile station connects; and
   controlling, at the mobile station a transmission rate of uplink user data to be transmitted via the logical channel:
      (1) according to the received rate command, when the mobile station has not received from a radio network controller a guaranteed bit rate of the logical channel, the guaranteed bit rate comprising a numerical value, and
      (2) according to the guaranteed bit rate and not the rate command, when the mobile station has received the guaranteed bit rate from the radio network controller.

2. A mobile station for transmitting uplink user data via a logical channel, comprising:
   a QoS information receiving unit configured to receive a guaranteed bit rate comprising a numerical value, of the logical channel from a radio network controller; and
   a transmission rate control unit configured to control a transmission rate of uplink user data to be transmitted via the logical channel that the guaranteed bit rate is received from the radio network controller:
      (1) according to a received rate command, when the mobile station has not received the guaranteed bit rate of the logical channel, and
      (2) according to the guaranteed bit rate and not the received rate command, when the mobile station has received the guaranteed bit rate of the logical channel.

* * * * *